United States Patent [19]

Sasaki

[11] Patent Number: 5,562,153
[45] Date of Patent: Oct. 8, 1996

[54] HEAT EXCHANGER AND METHOD OF MAKING HEAT EXCHANGERS

[75] Inventor: Kenichi Sasaki, Isesaki, Japan

[73] Assignee: Sanden Corporation, Isesaki, Japan

[21] Appl. No.: 350,139

[22] Filed: Nov. 29, 1994

[51] Int. Cl.$^6$ ............................. F28D 1/04; B21D 53/08
[52] U.S. Cl. ...................... 165/76; 165/151; 29/726.5; 29/468
[58] Field of Search ..................................... 165/173, 151, 165/76; 29/464, 468, 890.03, 726, 726.5

[56] References Cited

U.S. PATENT DOCUMENTS

| | | | |
|---|---|---|---|
| 1,903,125 | 3/1933 | Modine . | |
| 2,180,907 | 11/1939 | Neale et al. | 165/151 X |
| 2,226,243 | 12/1940 | Herz | 165/151 X |
| 2,410,140 | 10/1946 | Young | 29/726 |
| 3,310,868 | 3/1967 | Laporte et al. | 165/151 X |
| 3,868,830 | 3/1975 | Fletcher et al. . | |
| 4,164,064 | 8/1979 | Reavill | 29/468 |
| 4,279,298 | 7/1981 | Lee . | |
| 4,601,088 | 7/1986 | Kopczynski | 29/726 X |

FOREIGN PATENT DOCUMENTS

| | | | |
|---|---|---|---|
| 1036171 | 9/1953 | France | 29/890.03 |
| 4-351238 | 12/1992 | Japan | 29/890.03 |
| 6-15394 | 1/1994 | Japan | 29/890.03 |

*Primary Examiner*—Allen J. Flanigan
*Attorney, Agent, or Firm*—Baker & Botts L.L.P.

[57] ABSTRACT

The invention relates to heat exchangers and methods of manufacturing heat exchangers. The heat exchanger includes a pair of tanks, each of which includes a plurality of connection holes aligned in substantially parallel rows, and a plurality of heat transfer tubes. The plurality of tubes fluidly interconnects between the pair of tanks by insertion into the tanks' connection holes. The method comprises the following steps: (1) inserting first ends of the heat transfer tubes through a plurality of assembly holes of an assembly plate, the assembly holes of the assembly plate are substantially identical to the connection holes of the tanks in number, pitch, and diameter; (2) placing the first ends of the heat transfer tubes which were inserted through the assembly holes of the one assembly plate on a first tank of the tanks; (3) sliding the assembly plate toward the first ends of the heat transfer tubes, so that the first ends of the heat transfer tubes are precisely aligned in rows corresponding to those of the first tank's connection holes; (4) simultaneously inserting the first ends of heat transfer tubes into the connecting holes of the first tank; (5) placing a second tank of the tanks on the second ends of the heat transfer tubes; (6) sliding the assembly plate toward the second ends of the heat transfer tubes, so that the second ends of the heat transfer tubes are precisely aligned in rows corresponding to those of the second tank's connection holes; (7) simultaneously inserting the second ends of the heat transfer tubes into the connection holes of the second tank; and (8) sealing the tanks to the heat transfer tubes with a brazing material. In heat exchangers manufactured according to this invention, the assembly plate may be connected to at least one of the tanks.

21 Claims, 10 Drawing Sheets

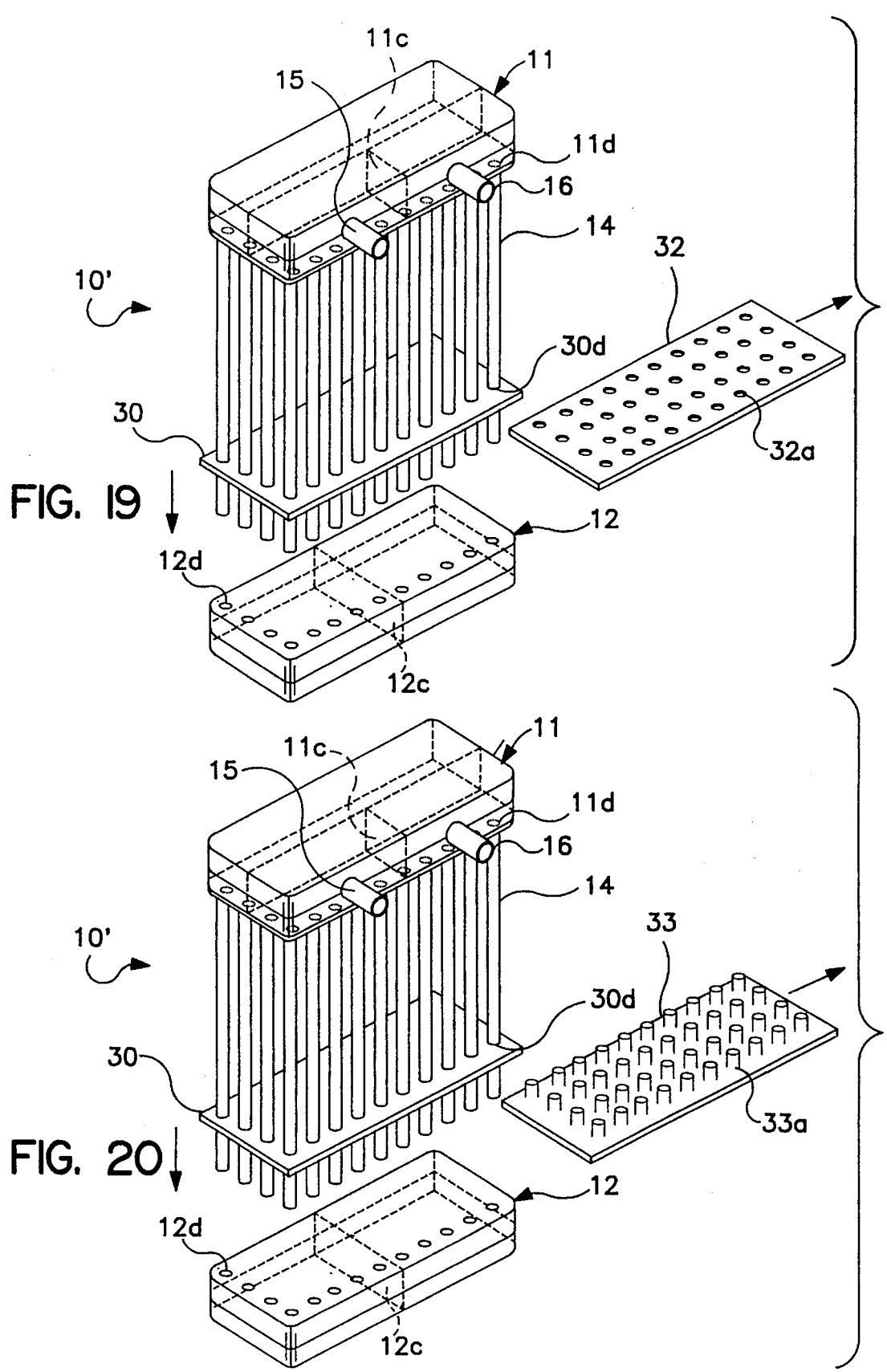

HEAT EXCHANGER AND METHOD OF MAKING HEAT EXCHANGERS

BACKGROUND OF INVENTIONS

1. Field of the Invention

This invention relates to a heat exchanger for use in a vehicle air conditioning system, and more particularly, to methods for connecting a plurality of heat transfer tubes in such heat exchangers.

2. Description of the Prior Art

FIG. 1 shows a conventional heat exchanger used in an air conditioning system, for example, an evaporator or a condenser. In FIG. 1, heat exchanger 10 comprises upper tank 11, lower tank 12, and heat exchanger core 13 disposed between upper tank 11 and lower tank 12. Heat exchanger core 13 comprises a plurality of heat transfer tubes 14 spaced from one another and disposed in parallel to one another. Upper tank 11 comprises upper wall 11a and lower wall 11b which are united with each other. Upper tank 11 is divided into three chambers, such as first upper chamber 18, second upper chamber 19, and third upper chamber 20, by partition portion 11c. Lower tank 12 is divided into two chambers, such as first lower chamber 21 and second lower chamber 22, by partition portion 12c. Lower wall 11b of upper tank 11 and upper wall 12a of lower tank 12 are provided with a plurality of connection holes 11d and a plurality of connection holes 12d, respectively, for connecting a plurality of heat transfer tubes 14 and, thereby, placing tanks 11 and 12 in communication. Inlet pipe 15 and outlet pipe 16 are connected to upper tank 11.

Referring to FIG. 2, for example, a heat exchanger medium is introduced via inlet pipe 15 into first upper chamber 18 and flows down through heat transfer tubes 14 to first lower chamber 21. It then flows back to second upper chamber 19 through heat transfer tubes 14. Further, the heat exchanger medium again flows from second upper chamber 19 through heat transfer tubes 14 and reaches second lower chamber 22. It then flows back to third upper chamber 20 through heat transfer tubes 14. When the heat exchanger medium flows through heat transfer tubes 14, heat exchange occurs between the heat exchanger medium and air flow 17 passing over heat transfer tubes 14, as shown in FIG. 2.

Generally, heat exchanger 10 uses numerous heat transfer tubes 14 to obtain a high heat exchange efficiency. In assembling processes, however, numerous heat transfer tube 14 are inserted, one by one, into connection holes 11d of upper tank 11 and connection holes 12d of lower tank 12, respectively, as shown in FIG. 3. This step of the assembly processes is both complicated and time consuming. As a result, the operational productivity of the assembling processes is reduced.

SUMMARY OF THE INVENTION

It is an object of the invention to provide a heat exchanger, wherein assembly may be accomplished by a simple and less time consuming process.

An embodiment of the invention is a method of manufacturing a heat exchanger. The heat exchanger includes a pair of tanks, each of which includes a plurality of connection holes aligned in rows, and a plurality of heat transfer tubes. The plurality of tubes fluidly interconnects between the pair of tanks by insertion into the tanks' connection holes. The method comprises the following steps: (1) inserting first ends of the heat transfer tubes through a plurality of assembly holes of at least one assembling plate member, the assembly holes of the at least one assembling plate member are substantially identical to the connection holes of the tanks in number, pitch, and diameter; (2) placing the first ends of the heat transfer tubes which were inserted through the assembly holes of the at least one assembling plate member in contact with a first tank of the tanks; (3) sliding the at least one assembling plate member toward the first ends of the heat transfer tubes, so that the first ends of the heat transfer tubes are aligned in rows corresponding to those of the first tank's connection holes; (4) simultaneously inserting the first ends of heat transfer tubes into the connection holes of the first tank; (5) placing a second tank of the tanks in contact with second ends of the heat transfer tubes; (6) sliding the at least one assembling plate member toward the second ends of the heat transfer tubes, so that the second ends of the heat transfer tubes are aligned in rows corresponding to those of the second tank's connection holes; (7) simultaneously inserting the second ends of the heat transfer tubes into the connection holes of the second tank; and (8) sealing the tanks to the heat transfer tubes with a sealing material, e.g., glue or a brazing material, such as solder or the like.

Thus, inserting heat transfer tubes into connection holes of the tanks by using the assembling plate member may be easily accomplished and produces an assembling process which is not time consuming because the ends of the heat transfer tube may be precisely aligned in the same rows as the connection holes of the tanks. As a result, the operational productivity of the assembling process is increased.

Another embodiment of the invention is also a method of manufacturing a heat exchanger. The heat exchanger includes a pair of tanks, each of which includes a plurality of connection holes aligned in rows, and a plurality of heat transfer tubes. The plurality of tubes fluidly interconnects between the pair of tanks by insertion into the tanks' connection holes. The method comprises the following steps: (1) inserting first ends of the heat transfer tubes into a plurality of assembly holes of at least one assembling plate member, the assembly holes of the at least one assembling plate member are substantially identical to the connection holes of the tanks in number, pitch and diameter; (2) placing the first ends of the heat transfer tubes which were inserted through the assembly holes of the at least one assembling plate member on a jig plate member, so that the first ends of the heat transfer tubes are aligned and levelled in rows; (3) placing a first tank of the tanks on second ends of the heat transfer tubes; (4) sliding the at least one assembly plate member toward the second ends of the heat transfer tubes, so that the second ends of the heat transfer tubes are aligned in rows, corresponding to those of the first tank's connection holes; (5) simultaneously inserting the second ends of the heat transfer tubes into the connecting holes of the first tank; (6) removing the jig plate member; (7) placing a second tank of the tanks where the jig plate member had been positioned; (8) sliding the at least one assembly plate member toward the first ends of the heat transfer tubes, so that the first ends of the heat transfer tubes are aligned in rows, corresponding to those of the second tank's connection holes; (9) simultaneously inserting the first ends of the heat transfer tubes into the connection holes of the second tank; and (10) sealing the tanks to the heat transfer tubes with a sealing material.

Yet another embodiment of this invention is a heat exchanger manufactured by the methods described above, wherein the at least one assembly plate member is connected to at least one of the tanks.

Further objects, features, and advantages of this invention will be understood from the following detailed description of embodiments of this invention and by referring to the accompanying drawings.

BRIEF DESCRIPTION OF THE DRAWING

For a more complete understanding of the present invention and the technical advantages thereof, reference is made to the following detailed description taken in conjunction with accompanying drawings, in which:

FIGS. 17–19 are perspective views showing a heat exchanger in accordance with a fourth embodiment of the present invention.

FIG. 20 is a perspective view showing a heat exchanger in accordance with a fifth embodiment of the present invention.

DETAILED DESCRIPTION OF THE DRAWINGS

Figure 1:
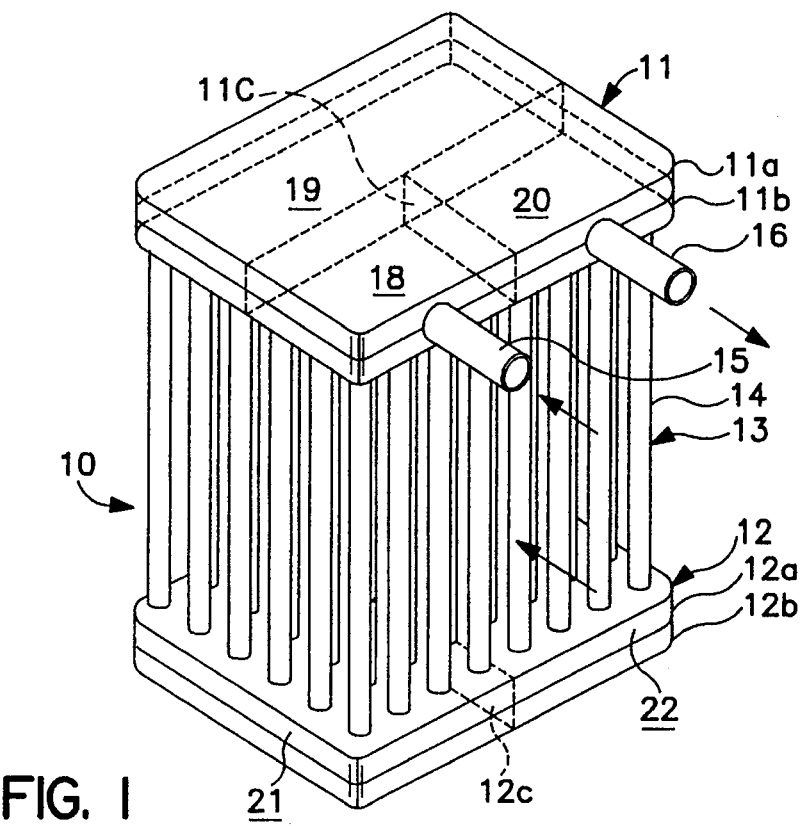
FIG. 1 is a perspective view of a heat exchanger in accordance with the prior art.
Figure 2:
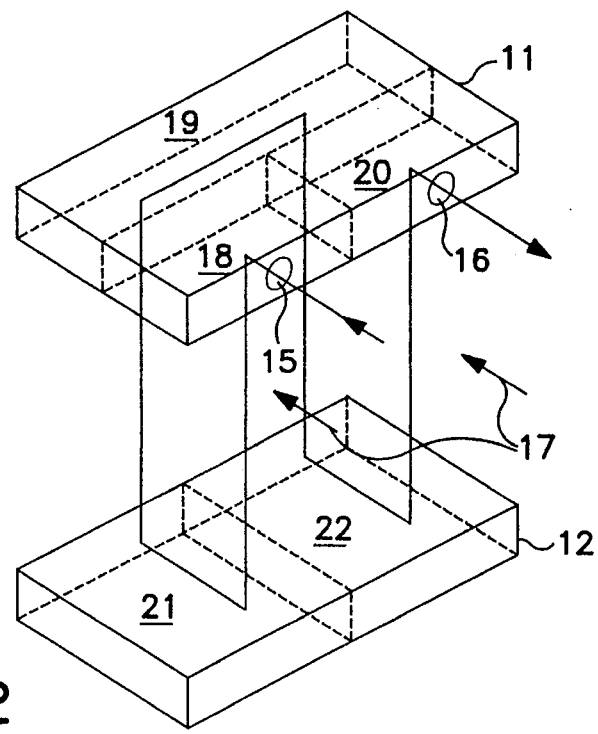
FIG. 2 is a schematic perspective view of a known heat exchanger depicting the flow path of a heat exchanger medium.
Figure 3:
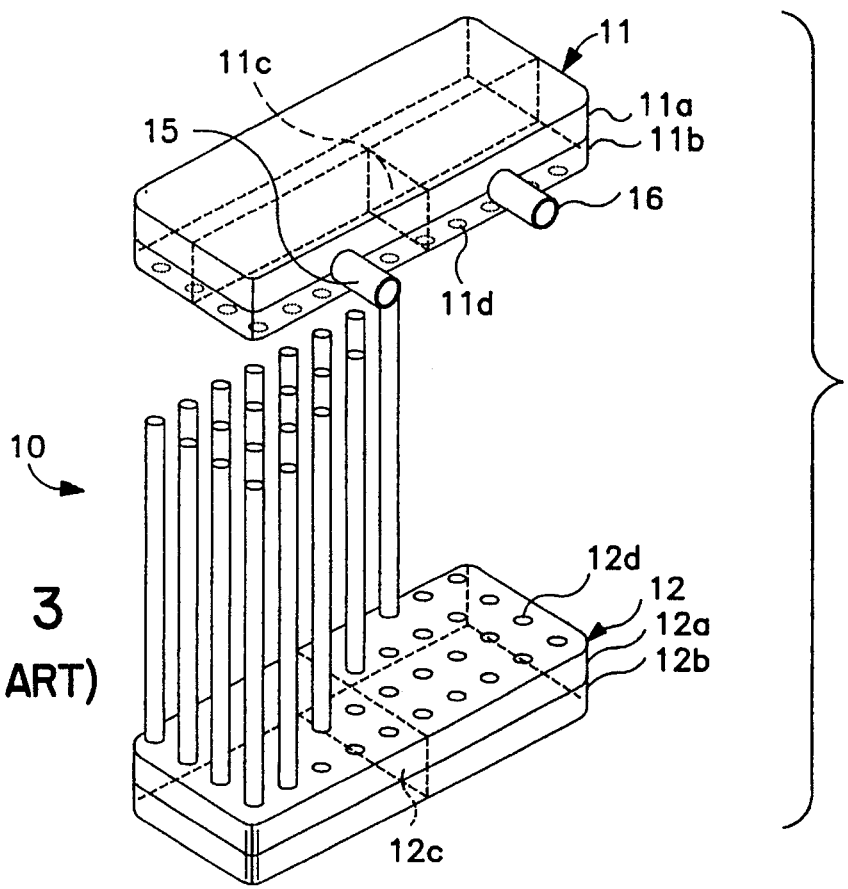
FIG. 3 is a perspective view showing a heat exchanger assembled in accordance with the prior art.

In the manufacturing of heat exchanger 10', similar elements to those depicted in FIG. 1 have been given the same reference numerals, and their descriptions are not repeated here. Referring to FIGS. 4–9, a method for assembling heat exchanger 10' in accordance with a first embodiment of this invention is shown. An assembly plate 30 includes a plurality of assembly holes 30d therein. The plurality of assembly holes 30d are formed with a predetermined number, pitch, and diameter, which are substantially the same as those of a plurality of connection holes 11d of upper tank 11 and a plurality of connection holes 12d of lower tank 12. Assembly plate 30 comprises a metal core 30a, which may be made from an aluminum-zinc (Al–Zn) alloy, such as AA3003, with cladding 30b, such as A7072. Cladding 30b may include a brazing material 30c on one or both of the surfaces of plate 30.

Figure 4:
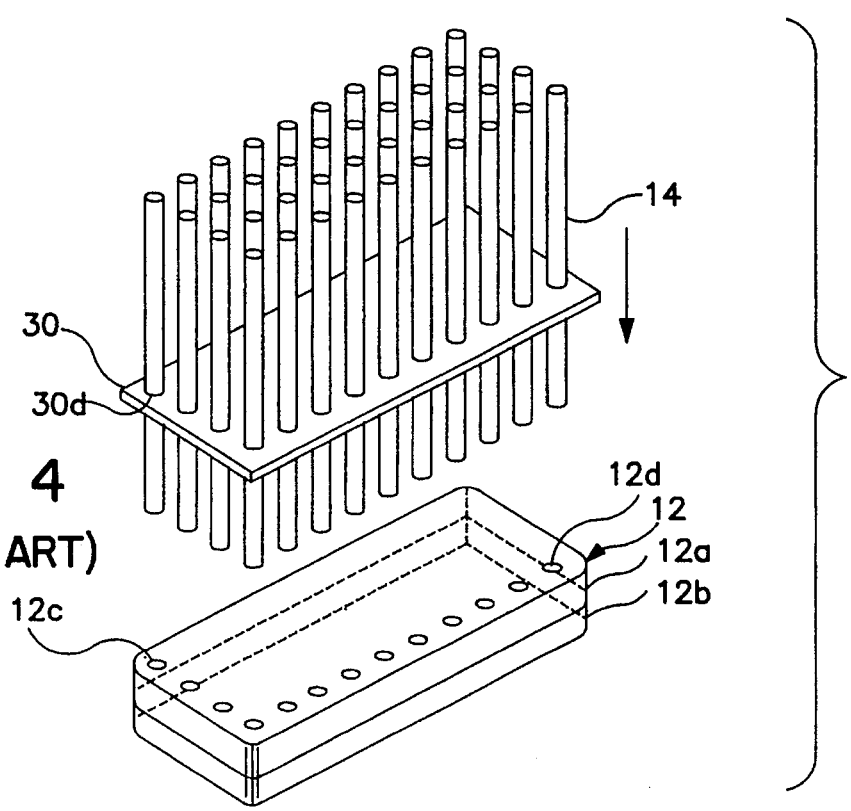
FIGS. 4–9 are perspective views showing a heat exchanger in accordance with a first embodiment of the present invention.
Figure 5:
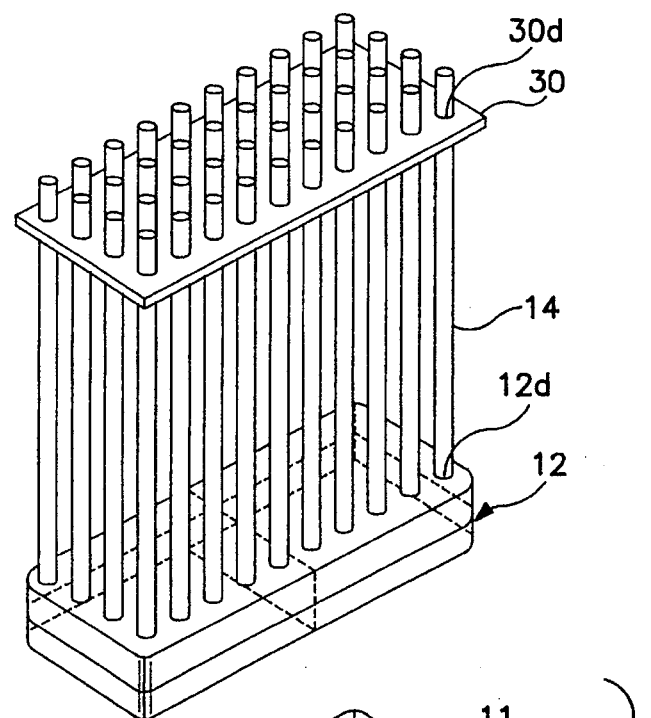

In an assembling process, a plurality of heat transfer tubes 14 are inserted through assembly holes 30d of assembly plate 30. First ends of heat transfer tubes 14, which were inserted through assembly plate 30, are placed on lower tank 12. Then, assembly plate 30 may be gradually slid down toward lower tank 12 and close to the first ends of heat transfer tubes 14, such that assembly plate 30 remains parallel to the upper surface of lower tank 12. Thus, the first ends of the heat transfer tubes 14 are precisely aligned in the same substantially parallel rows as those of connection holes 12d of lower tank 12. Further, the first and second ends of heat transfer tubes 14 are formed with a taper, such as taper 14a in FIG. 7, so that they may easily be inserted into connection holes 12d of lower tank 12 and connection holes 11d of upper tank 11, respectively. All of the first ends of heat transfer tubes 14 then may easily be inserted into connection holes 12d of lower tank 12 at the same time, as shown in FIGS. 4 and 5.

Figure 6:
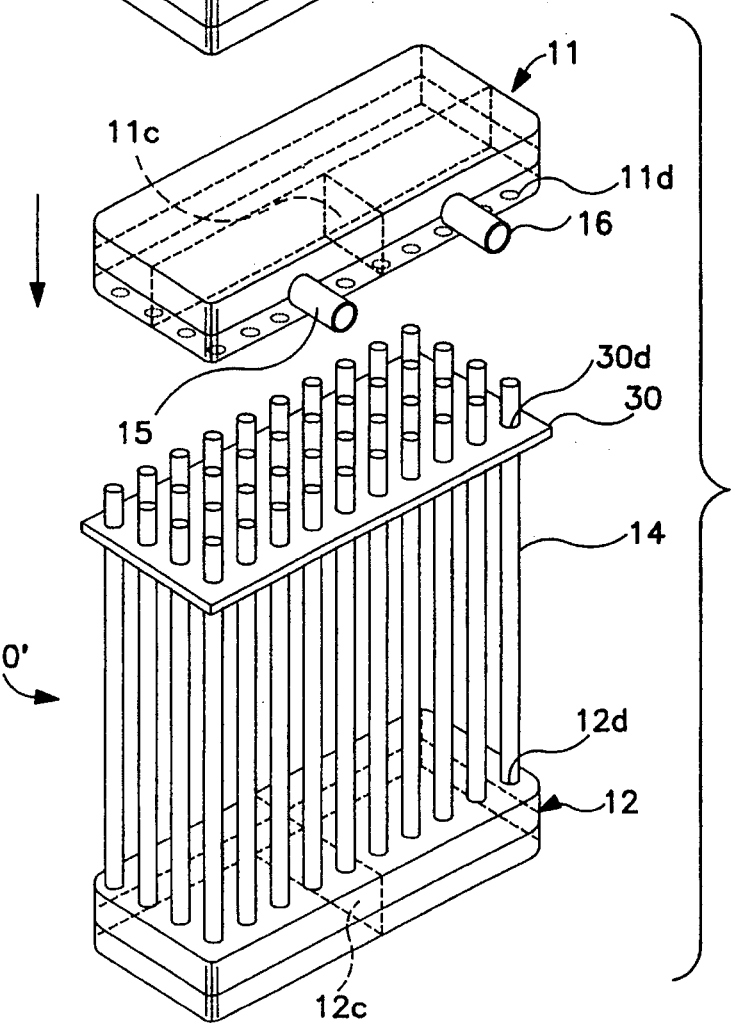
Figure 7:
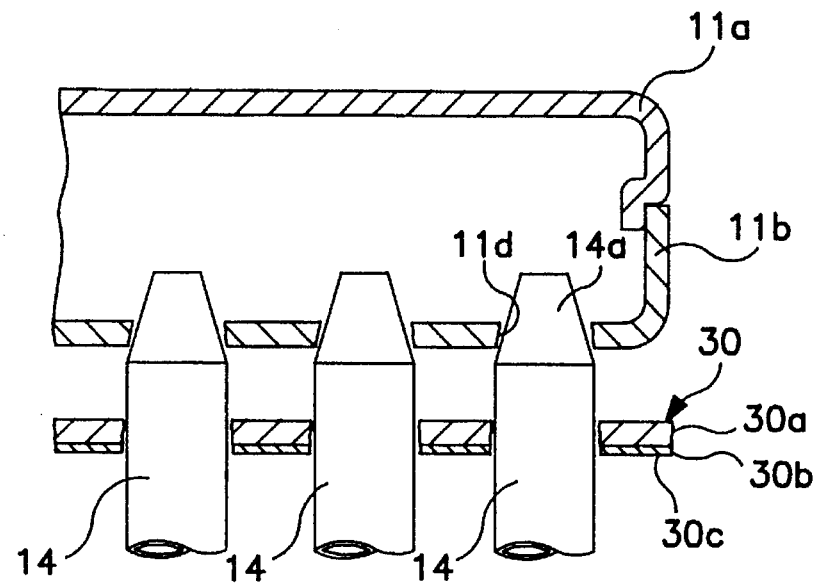

Subsequently, assembly plate 30 may be gradually slid up toward upper tank 11 and close to the second ends of heat transfer tubes 14, such that assembly plate 30 remains parallel to the lower surface of upper tank 11. Thus, the second ends of heat transfer tubes 14 may be precisely aligned in the same, substantially parallel rows as those of connection holes 11d of upper tank 11. All of the second ends of heat transfer tubes 14 then may be inserted into connection holes 11d of upper tank 11 at the same time, as shown in FIGS. 6 and 7.

Figure 8:
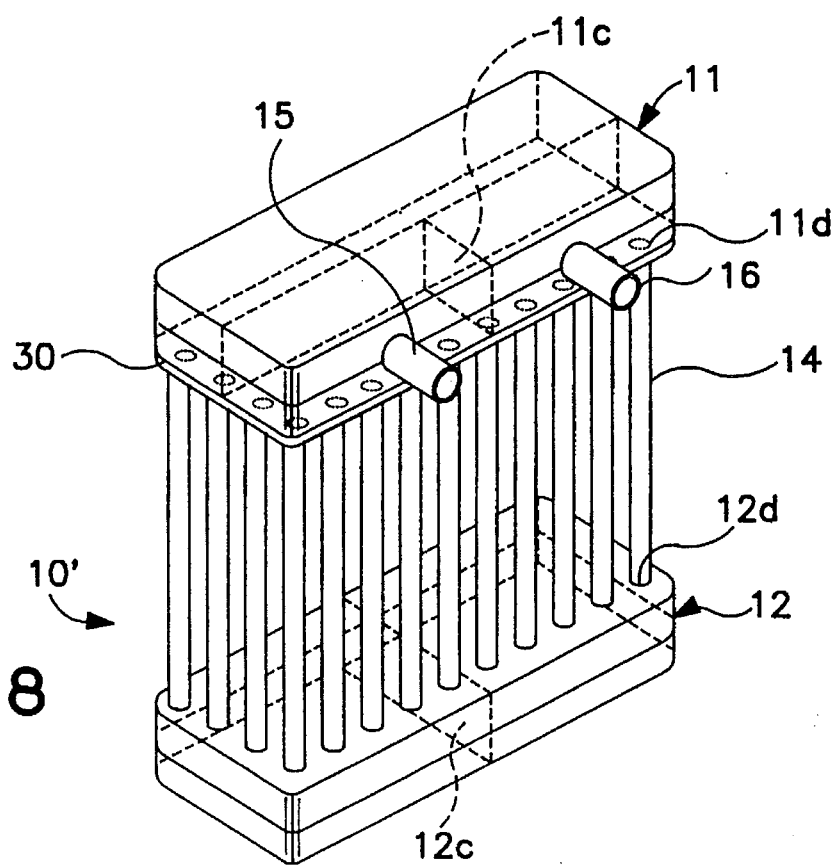
Figure 9:
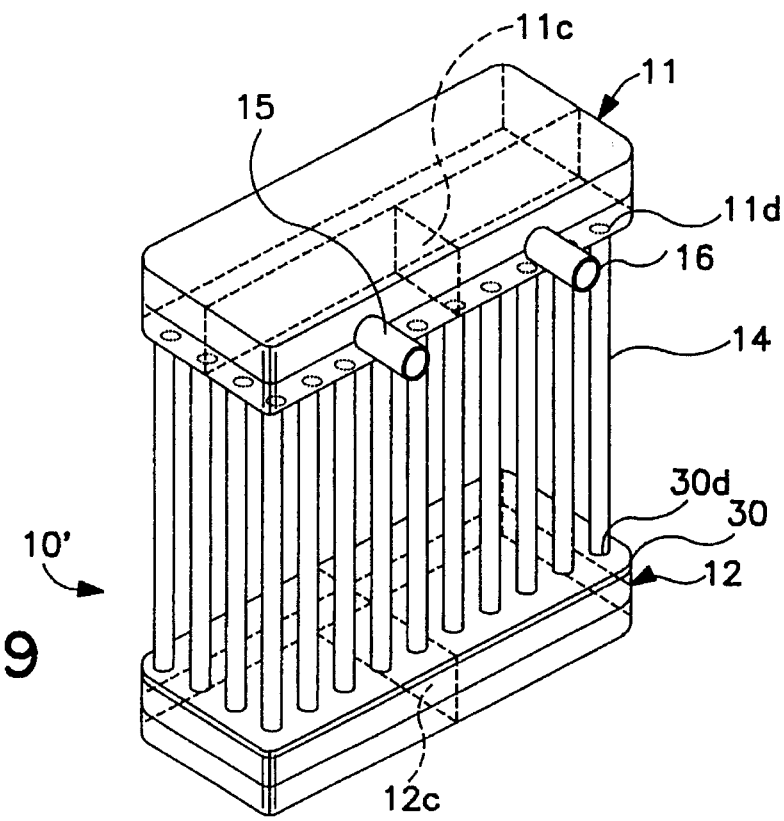

In a final step of the assembling process, assembly plate 30 may be placed close to and completely in contact with upper tank 11. Accordingly, assembled heat exchanger 10' may be placed in a brazing furnace, such that all of the parts may be simultaneously brazed together. Thus, assembly plate 30 then may be naturally brazed so as to connect with upper tank 11 by melting brazing material 30c, as shown in FIG. 8. Alternatively, assembly plate 30 may be brazed so as to connect with lower tank 12, as shown in FIG. 9.

Therefore, inserting heat transfer tubes 14 into connection holes lid of upper tank 11 and connection holes 12d of lower tank 12, one tank at a time, is easily and quickly accomplished in this assembling process. Because the ends of heat transfer tubes 14 are precisely aligned in the same rows as those of the connection holes of the tanks, the operational productivity of the assembling process increases.

Figure 10:
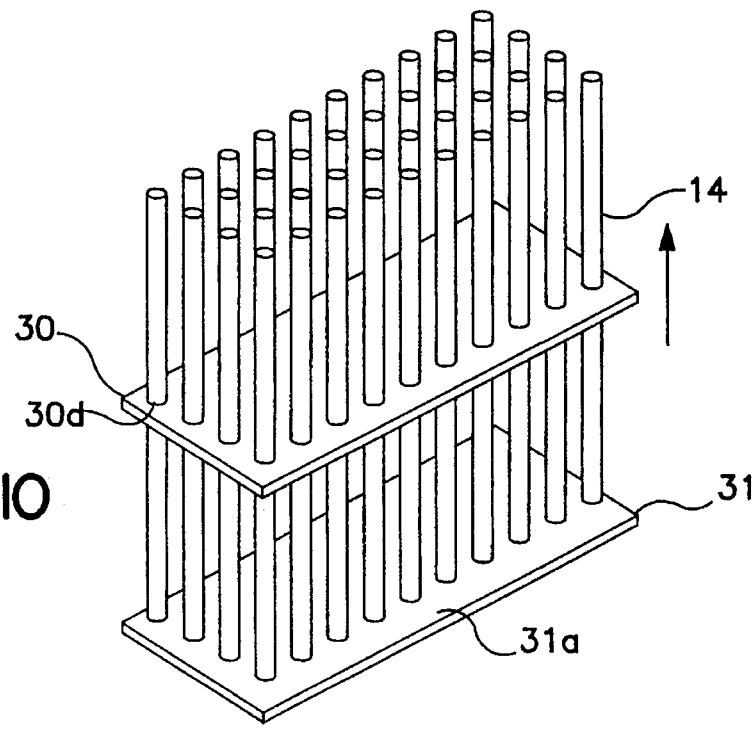
FIGS. 10–12 are perspective views showing a heat exchanger in accordance with a second embodiment of the present invention.
Figure 11:
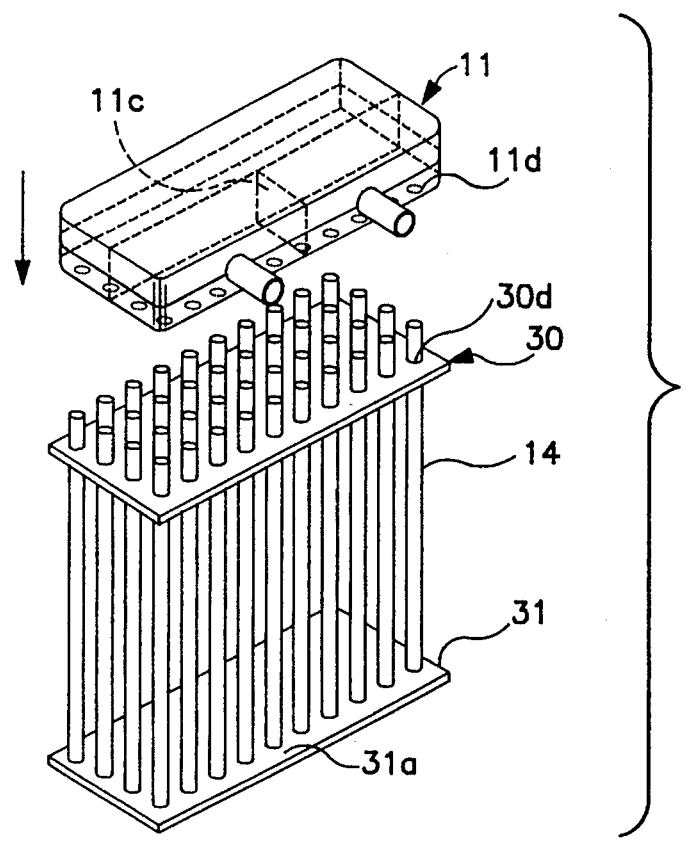
Figure 12:
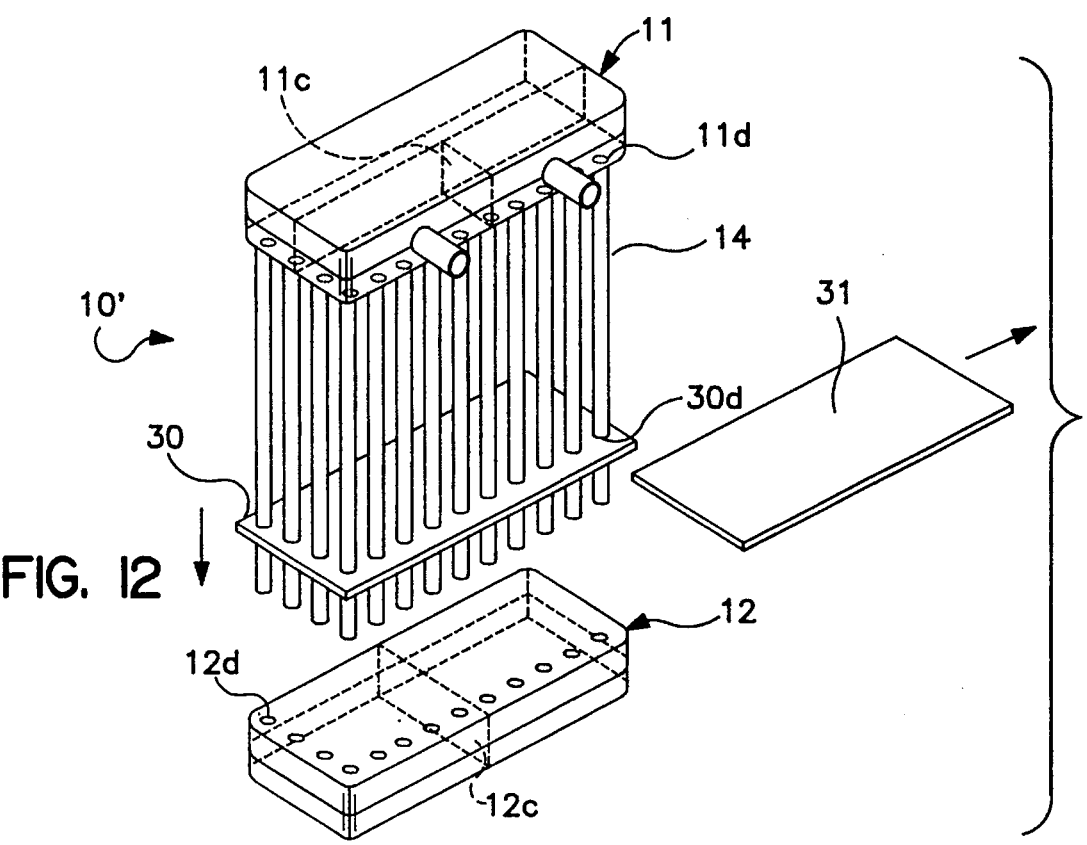
Figure 13:
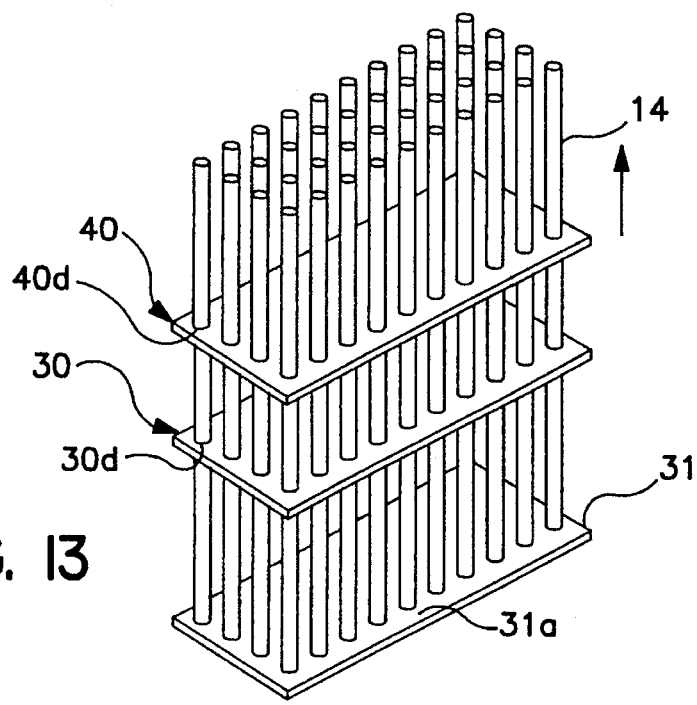
FIGS. 13–16 are perspective views showing a heat exchanger in accordance with a third embodiment of the present invention.

Referring to FIGS. 10–12, a method for assembling heat exchanger 10' in accordance with a second embodiment of this invention is depicted. Jig plate 31 for use in this assembling process includes flat plane 31a, the surface dimensions of which are identical to or larger than those of the lower surface of upper tank 11 or the upper surface of lower tank 12.

In the assembling process, a plurality of heat transfer tubes 14 are inserted through assembly holes 30d of assembly plate 30. First ends of heat transfer tubes 14, which were inserted through assembly holes 30d of assembly plate 30, are placed on flat plane 31a of jig plate 31, so that the first ends of heat transfer tubes 14 are aligned and levelled in rows. Further, connection holes 11d of upper tank 11 face and hold down the second ends of heat transfer tubes 14. Assembly plate 30 then may be gradually slid toward upper tank 11 and close to the second ends of heat transfer tubes 14, such that assembly plate 30 remains substantially parallel to the lower surface of upper tank 11. Thus, the second ends of heat transfer tubes 14 may be precisely aligned in the same rows as those of connection holes 11d of upper tank 11. All of the second ends of heat transfer tubes 14 then may easily be inserted into connection holes 11d of upper tank 11 at the same time, as shown in FIG. 11.

Subsequently, jig plate 31 is displaced. Lower tank 12 then is moved to where jig plate 31 was positioned, such that connection holes 12d underlie tubes 14. First ends of heat transfer tubes 14 contact the upper surface of lower tank 12 by moving down the partially-assembled heat exchanger, wherein upper tank 11 is connected with heat transfer tubes 14. Assembly plate 30 may be gradually slid down toward lower tank 12 and close to edge 14a of heat transfer tubes 14, such that assembly plate 30 remains substantially parallel to the upper surface of lower tank 12. Thus, first ends of heat transfer tubes 14 may be precisely aligned in the same rows as those of connection holes 12d of lower tank 12. All of the first ends of heat transfer tubes 14 then may insert into connection holes 12c of lower tank 12 at the same time, as shown in FIG. 12.

Figure 14:
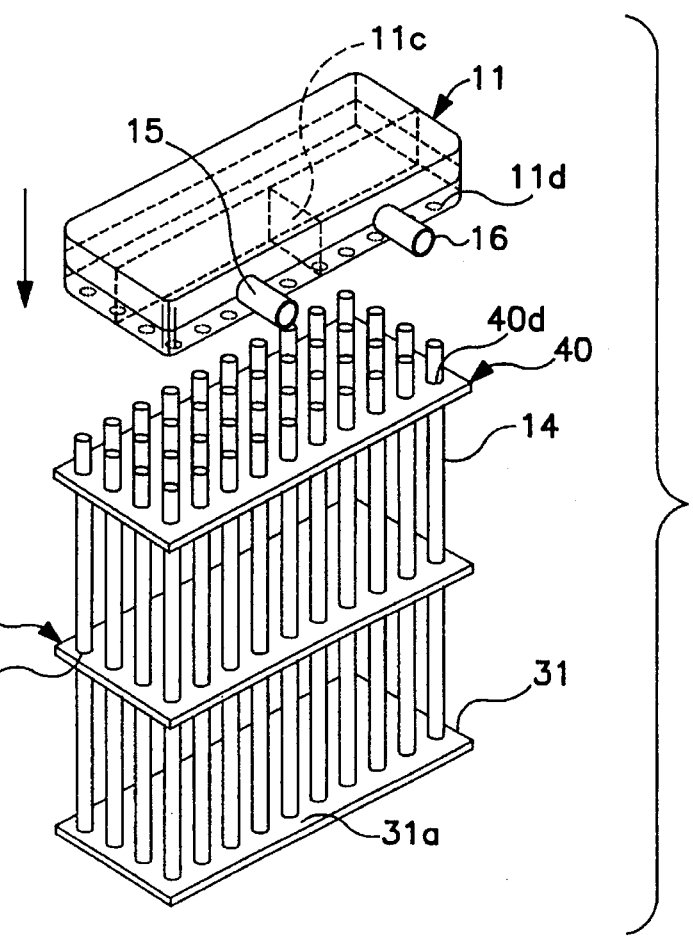

With reference to FIGS. 13–16, the process of assembling a heat exchanger according to a third embodiment of the present invention is shown. The specifications of a second assembly plate 40 are substantially identical to those of a first assembly plate 30. In an assembling process, a plurality of heat transfer tubes 14 may be inserted through assembly holes 30d of first assembly plate 30 and assembly holes 40d of second assembly plate 40. First ends of heat transfer tubes 14, which were inserted through first assembly holes 30d and second assembly holes 40d of first assembly plate 30 and second assembly plate 40, respectively, may be placed on and levelled against flat plane 31a of jig plate 31. Further, connection holes 11d of upper tank 11 face and hold down the second ends of heat transfer tubes 14. Second assembly plate 40 then may be gradually slid up toward upper tank 11 and close to the second ends of heat transfer tubes 14, such that assembly plate 40 remains substantially parallel to the lower surface of upper tank 11. Thus, the second ends of heat transfer tubes 14 may be precisely aligned in the same rows as those of connection holes 11d of upper tank 11. All of the second ends of heat transfer tubes 14 then may be easily inserted into connection holes 11d of upper tank 11 at the same time, as shown in FIG. 14.

Figure 15:
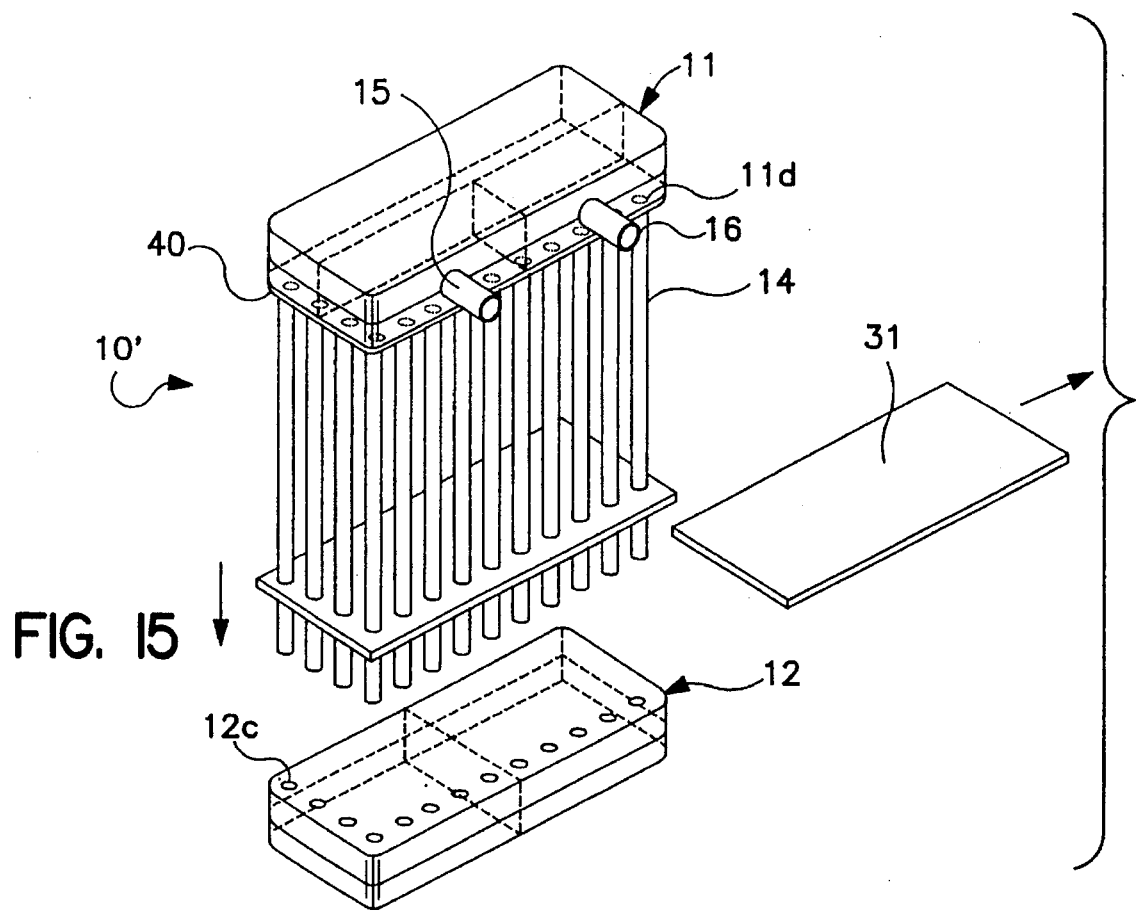

Subsequently, jig plate 31 is displaced. Lower tank 12 is moved to where jig plate 31 was positioned, such that connection holes 12d underlie tubes 14, as shown in FIG. 15. First ends of heat transfer tubes 14 then may contact the upper surface of lower tank 12 by moving down the partially-assembled heat exchanger, wherein upper tank 11 is connected with heat transfer tubes 14. Assembly plate 30 may be gradually slid down toward lower tank 12 and close to the first ends of heat transfer tubes 14, such that assembly plate 30 remains substantially parallel to the upper surface of lower tank 12. Thus, all of the first ends of heat transfer tubes 14 may be inserted into connection holes 12d of lower tank 12 at the same time, as shown in FIG. 15.

Figure 16:
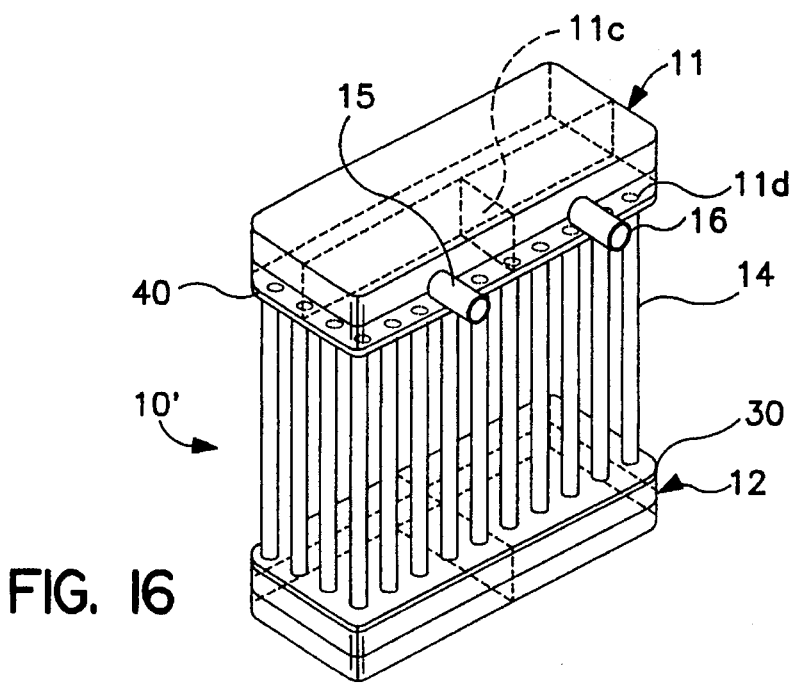

In a final step of this assembling process, second assembly plate 40 may closely contact upper tank 11. Similarly, first assembly plate 30 may closely contact lower tank 12. Accordingly, assembled heat exchanger 10' may be placed in a brazing furnace, such that all of its parts are simultaneously brazed together. Thus, first assembly plate 30 and second assembly plate 40 may be brazed, so as to connect with lower tank 12 and upper tank 11, respectively, by melting brazing material 30c and brazing material 40c, as shown in FIG. 16.

Figure 17:
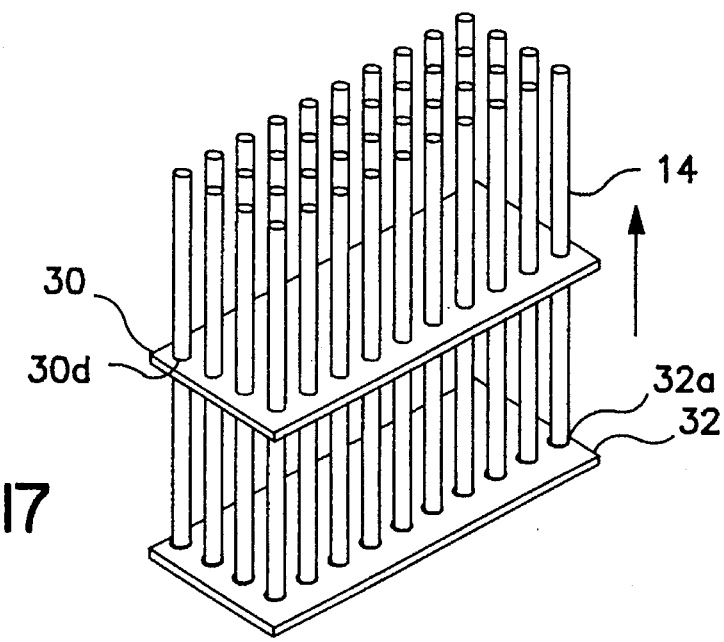
Figure 18:
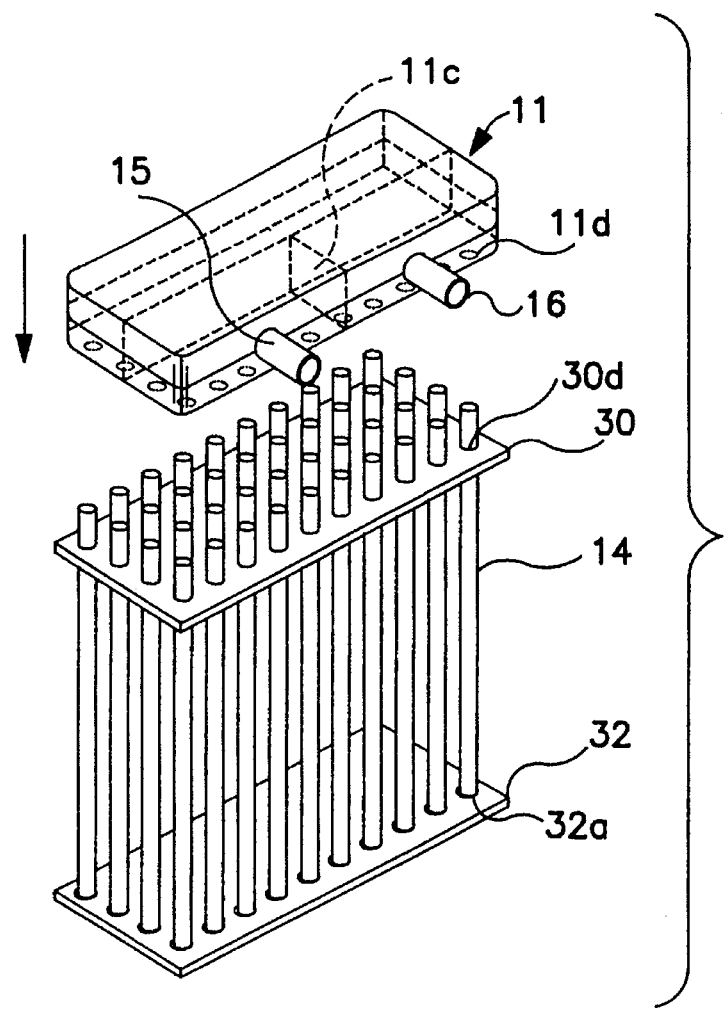

Referring to FIGS. 17–19, the process of assembling a heat exchanger according to a fourth embodiment of the present invention is shown. Jig plate 32 includes a plurality of grooves 32a on the surface thereof as shown in FIG. 19. The plurality of grooves 32a are equal to or slightly larger in number, pitch, and diameter than connection holes 11d of upper tank 11 and connection holes 12d of lower tank 12. First ends of heat transfer tubes 14, which are inserted into assembly plate 30, are placed on and fit into the plurality of grooves 32a of jig plate 32, so that tubes 14 are aligned and levelled in substantially parallel rows. The remaining steps are similar to those described with respect to second embodiment. In addition, jig plate member 33 may include a plurality of projections 33a on the surface thereof, as shown in FIG. 20. Projections 33a are equal to or smaller in number, pitch, and diameter than connection holes 11d of upper tank 11 and connection holes 12d of lower tank 12, as shown in FIG. 20. Jig plate member 33 and projections 33a are employed in a manner substantially similar to jig plate 32 and grooves 32a to align and level tubes 14. The function and effect of these embodiments are almost identical to those of the first embodiment described above.

This invention has been described in connection with detailed embodiments. These embodiments, however, are merely exemplary and the invention is not restricted thereto. It will be easily understood by those skilled in the art the variations may be easily made within the scope of this invention, as defined by the following claims.

I claim:

1. A method of manufacturing a heat exchanger which includes a pair of tanks, each of said pair of tanks including a plurality of connection holes aligned in rows and a plurality of heat transfer tubes, said plurality of tubes fluidly interconnected between said pair of tanks by insertion into said connection holes of said tanks, comprising the steps of:

inserting first ends of said heat transfer tubes into a plurality of assembly holes of at least one assembling plate member, said assembly holes of said at least one assembling plate member are substantially identical to said connection holes of said tanks in number, pitch, and diameter;

placing said first ends of said heat transfer tubes which were inserted through said assembly holes of said at least one assembling plate member in contact with a first tank of said tanks;

sliding said at least one assembling plate member toward said first ends of said heat transfer tubes, so that said first ends of heat transfer tubes are aligned in rows corresponding to those of said first tank's connection holes;

simultaneously inserting said first ends of said heat transfer tubes into said connection holes of said first tank;

placing a second tank of said tanks in contact with second ends of said heat transfer tubes;

sliding said at least one assembly plate member toward said second ends of said heat transfer tubes, to that said second ends of said heat transfer tubes are aligned in rows corresponding to those of said second tank's connection holes;

simultaneously inserting said second ends of said heat transfer tubes into said connection holes of said second tank; and sealing said tanks to said heat transfer tubes with a sealing material.

2. The method of claim 1, wherein at least one surface of said at least one assembling plate member is clad with a brazing material.

3. The method of claim 1, wherein said at least one assembling plate member is an assembly plate and further comprising the step of sealing said single assembly plate to one of said tanks.

4. The method of claim 1, wherein said at least one assembling plate member includes a first and a second assembly plate and further comprises the step of sealing said first assembly plate to said first tank and said second assembly plate sealed to said second tank.

5. A heat exchanger manufactured according to the method of claim 1, wherein said at least one assembling plate member is directly connected to at least one of said tanks.

6. A method of manufacturing a heat exchanger which includes a pair of tanks each of said pair of tanks including a plurality of connection holes aligned in rows and a plurality of heat transfer tubes, said plurality of tubes fluidly interconnected between said pair of tanks by inserting into said connection holes of said tanks, comprising the steps of:

inserting first ends of said heat transfer tubes into a plurality of assembly holes of at least one assembling plate member, said assembly holes of said at least one assembling plate member are substantially identical to said connection holes of said tanks in number, pitch and diameter;

placing said first ends of said heat transfer tubes which were inserted through said assembly holes of said at least one assembling plate member on a jig plate member, so that said first ends of said heat transfer tubes are aligned and levelled in rows;

placing a first tank of said tanks on second ends of said heat transfer tubes;

sliding said at least one assembly plate member toward said second ends of said heat transfer tubes, so that said second ends of said heat transfer tubes are aligned in rows, corresponding to those of said first tank's connection holes;

simultaneously inserting said second ends of said heat transfer tubes into said connecting holes of said first tank;

removing said jig plate member;

placing a second tank of said tanks where said jig plate member had been positioned;

sliding said at least one assembly plate member toward said first ends of said heat transfer tubes, so that said first ends of said heat transfer tubes are aligned in rows, corresponding to those of said second tank's connection holes;

simultaneously inserting said first ends of said heat transfer tubes into said connection holes of said second tank; and sealing said tanks to said heat transfer tubes with a sealing material.

7. The method of claim 6, wherein at least one surface of said at least one assembling plate member is clad with a brazing material.

8. The method of claim 6, further comprising the step of sealing said at least one assembling plate member to at least one of said tanks.

9. The method of claim 6, wherein said at least one assembling plate member includes a first and a second assembly plate and further comprising the step of sealing said first assembly plate to said first tank and said second assembly plate to said second tank.

10. The method of claim 6, wherein said jig plate member includes locating means for aligning said heat transfer tubes in lateral rows.

11. The method of claim 10, wherein said locating means of said jig plate member is a plurality of grooves.

12. The method of claim 10, wherein said locating means of said jig plate member is a plurality of projections.

13. A heat exchanger manufactured according to the method of claim 6, wherein said at least one assembling plate member is directly connected to at least one of said tanks.

14. A method of manufacturing a heat exchanger which includes a pair of tanks, each of said pair of tanks including a plurality of connection holes aligned in rows and a plurality of heat transfer tubes, said plurality of tubes fluidly interconnected between said pair of tanks by insertion into said connection holes of said tanks, comprising the steps of:

simultaneously inserting said first ends of said heat transfer tubes into said connection holes of said first tank;

simultaneously inserting second ends of said heat transfer tubes into said connection holes of a second tank of said tanks; and sealing said tanks to said heat transfer tubes with a sealing material;

wherein the steps of simultaneously inserting first and second ends of said heat transfer tubes into connection holes of said first and second tanks comprises:

inserting ends of said heat transfer tubes into a plurality of assembly holes of at least one assembling plate member, said assembly holes of said at least one assembling plate member being substantially identical to said connection holes of said tanks in number, pitch, and diameter;

sliding said at least one assembling plate member toward said inserted ends of said heat transfer tubes, so that said inserted ends of said heat transfer tubes aligned in rows corresponding to those of said tank's connection holes; and simultaneously inserting said ends of said heat transfer tubes into said connection holes of one of said tanks.

15. The method of claim 14, wherein the step of simultaneously inserting first ends of said heat transfer tubes into said connection holes of a first tank comprises:

inserting said first ends of said heat transfer tubes into a plurality of assembly holes of at least one assembling plate member, said assembly holes of said at least one assembling plate member being substantially identical to said connection holes of said tanks in number, pitch, and diameter;

placing said first ends of said heat transfer tubes which were inserted through said assembly holes of said at least one assembling plate member in contact with the first tank;

sliding said at least one assembling plate member toward said first ends of said heat transfer tubes, so that said first ends of said heat transfer tubes are aligned in rows corresponding to those of said first tank's connection holes; and, simultaneously inserting said first ends of said heat transfer tubes into said connection holes of said first tank.

16. The method of claim 15 wherein the step of simultaneously inserting second ends of said heat transfer tubes into said connection holes of a second tank comprises:

placing said second tank in contact with said second ends of said heat transfer tubes;

sliding said at least one assembling plate member toward said second ends of said heat transfer tubes, so that said second ends of said heat transfer tubes are aligned in rows corresponding to those of said second tank's connection holes; and, simultaneously inserting said second ends of said heat transfer tubes into said connection holes of said second tank.

17. The method of claim 14 wherein the step of simultaneously inserting first ends of said heat transfer tubes into said connection holes of a first tank comprises:

inserting said second ends of said heat transfer tubes into a plurality of assembly holes of at least one assembling plate member, said assembly holes of said at least one assembling plate member being substantially identical to said connection holes of said tanks in number, pitch and diameter;

placing said second ends of said heat transfer tubes on a jig plate member, so that said second ends of said heat transfer tubes are aligned and levelled in rows;

placing said first tank on said first ends of said heat transfer tubes;

sliding said at least one assembling plate member toward said first ends of said heat transfer tubes, so that said first ends of said heat transfer tubes are aligned in rows, corresponding to those of said first tank's connection holes;

simultaneously inserting said first ends of said heat transfer tubes into said connection holes of said first tank; and, removing said jig plate.

18. The method of claim 17 wherein the step of simultaneously inserting second ends of said heat transfer tubes into said connection holes of a second tank comprises:

placing a second tank of said tanks where said jig plate member had been positioned;

sliding said at least one assembling plate member toward said second ends of said heat transfer tubes, so that said second ends of said heat transfer tubes are aligned in rows, corresponding to those of said second tank's connection holes;

simultaneously inserting said second ends of said heat transfer tubes into said connection holes of said second tank.

19. A heat exchanger manufactured according to the method of claim 14, wherein said at least one assembling plate member is directly connected to at least one of said tanks.

20. A heat exchanger manufactured according to the method of claim 15, whereto said at least one assembling plate member is directly connected to at least one of said tanks.

21. A heat exchanger manufactured according to the method of claim 17, wherein said at least one assembling plate member is directly connected to at least one of said tanks.

* * * * *

UNITED STATES PATENT AND TRADEMARK OFFICE
CERTIFICATE OF CORRECTION

PATENT NO. : 5,562,153
DATED : October 8, 1996
INVENTOR(S) : Kenichi Sasaki

It is certified that error appears in the above-indentified patent and that said Letters Patent is hereby corrected as shown below:

On the title page, item
[30]  Foreign Application Priority Data
    Nov. 29, 1993 [JP]    Japan .................... 5-326314

Signed and Sealed this

Twenty-fourth Day of December, 1996

Attest:

BRUCE LEHMAN

*Attesting Officer*    *Commissioner of Patents and Trademarks*